Dec. 2, 1924.
D. C. MAIER
1,517,369
FIXED GUN MOUNT FOR AIRPLANES
Filed Nov. 17, 1921
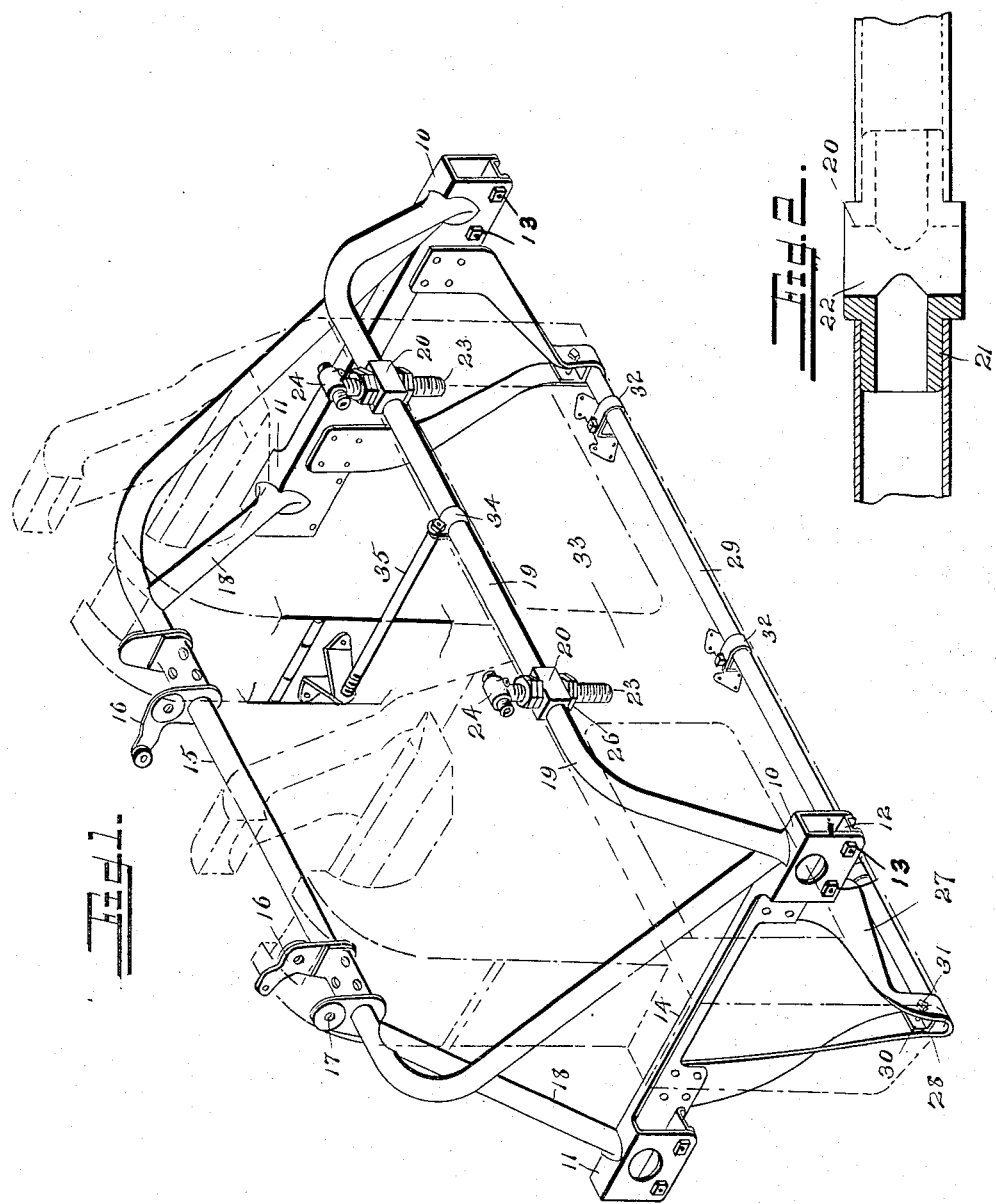
Inventor
D. C. Maier
By Robert H Young
Attorney Patented Dec. 2, 1924.

1,517,369

UNITED STATES PATENT OFFICE.

DWIGHT C. MAIER, OF BRYAN, OHIO.

FIXED GUN MOUNT FOR AIRPLANES.

Application filed November 17, 1921. Serial No. 515,802.

*To all whom it may concern:*

Be it known that I, DWIGHT C. MAIER, a citizen of the United States, residing at Bryan, in the county of Williams and State of Ohio, have invented certain new and useful Improvements in Fixed Gun Mounts for Airplanes, of which the following is a specification.

This invention relates to a fixed gun mount for airplanes.

An object of the invention is to provide a fixed gun mount of simple and sturdy construction which can be readily and firmly secured to the fuselage of the airplane and transmit the recoil stresses directly thereto with minimum vibration.

Another object of the invention is to afford convenient accessibilty to the principal parts of the installation without unduly interfering with the vision of the pilot or obstructing the controls of the airplane.

Other features of the invention promoting the strength, accessibility of the gun mount and convenience of operation of the machine guns mounted thereon will become apparent as the description proceeds.

The invention is described in the following specification in connection with the accompanying drawings, in which:

Figure 1 is a perspective view of the gun mount.

Figure 2 is a part sectional view of one of the blocks for receiving a rear mounting post.

According to my invention the gun mount is preferably supported directly on the longérons of the fuselage by means of a base having U-shaped clamps or brackets 10 and 11 which are adapted to fit over the longérons and to be detachably secured thereto by means of flanged spacing plates 12 and bolts 13 passing through the sides of the U-shaped clamps and through the flanges of plates 12. These bolts 13 and the nuts associated therewith bend the sides of the brackets 10 inwardly so that a clamping action is exerted on the longérons sufficient to hold the gun mount firmly in place. However, in order to add further rigidity to the base of the gun mount, the brackets 10 and 11 are integrally connected along the inner and upper sides of each upper longéron by an angle plate 14.

The front or trunnion support consists of a tubular yoke shaped member or bow 15, the arms of which are inclined upwardly from opposite brackets 10. That part of the member 15 connecting the arms is substantially horizontal and has secured thereon, in spaced relation, forward brackets 16 having transverse apertures 17 therein for receiving the usual trunnion bolts employed in mounting the trunnions of two machine guns (not shown). The bow or yoke-shaped member 15 is supported near each bracket 16 by means of tubular braces 18 which extend downwardly to the forward clamps 11. It will be noted that this front or trunnion support is very rigid and is designed to take the greater part of the weight of the guns and practically all of the recoil. The forces resulting from the recoil are transmitted to the base of the mount and to the longérons, principally by the arms of the yoke-shaped member 15 which are substantially lengthwise of the longérons so that only simple stresses of tension or compression are transmitted by the gun mount to the fuselage. The angle plates 14 connecting the clamps 10 and 11 act to reinforce the longérons and directly absorb a portion of these stresses.

The rear or elevating support consists of a short yoke shaped member 19 arranged substantially vertically and having its arms fixedly attached to the clamps or brackets 10. As shown in Figure 2, a block 20, preferably of steel is provided with oppositely projecting hollow bosses 21 which fit within the tubular member 19 and are welded thereto. This block is formed with a hole 22 of correct diameter to take the threaded stem 23 of the rear mounting post 24 of the machine gun and of sufficient length to prevent any lateral tilting of the post. Nuts 25, 26 engage the threaded stem 23 above and below the block and bear upon the upper and lower faces thereof to hold the stem in adjusted position. In the present instance two rear mounting posts 24 are supported on the short yoke shaped member 19 in correct alignment with the forward brackets 17 but it will be understood that the invention may be used with equal facility as a mount for one or a plurality of guns, in which case the forward brackets and rear mounting posts should be symmetrically arranged on the forward and rear yoke shaped members.

Depending brackets 27 are secured to the angle plates 14 of the base and are suitably bent to provide stirrups 28 adapted to support the ends of a cross-bar 29. The ends of the cross-bar 29 are maintained in the stirrups by means of channel-shaped retainers 30, the flanges of which are connected to the bracket 27 by bolts 31. Clips 32 are rotatably mounted on the bar 29 and serve as hinge supports for ammunition boxes 33. A clip 34 mounted on the yoke-shaped member 19 is adapted to receive one end of an adjustment rod 35 which, upon adjustment, moves the ammunition box pivotally about the cross-bar 29 to bring the feed chute, which is usually part of the box, in line with the feedway of the machine gun.

The rear, or elevating support simply holds the guns in alignment vertically and horizontally and by means of the rear mounting posts and blocks 20 provides for vertical adjustment. On the other hand, the front or trunnion support carries most of the weight of the guns and transmits the recoil directly to the base of the mount and to the longérons along the longitudinal axes thereof. The construction is such that the joints between the tubing and between the tubing and brackets are oxy-acetylene welded. The rigidity of the structure as well as its firm connection to the fuselage reduce vibration to a minimum and on account of the novel arrangement of parts there is no danger of destructive stresses being communicated to the fuselage.

Having thus described my invention, I claim:

1. A fixed gun mount for airplanes comprising a base, having forward and rear clamping members, a trunnion support and an elevating support secured to the rear clamping member, and braces extending between the forward clamping member and said trunnion support.

2. A fixed gun mount for airplanes comprising a base, a trunnion support and an elevating support secured to said base, braces extending between the trunnion support and said base, brackets fixed to said base, and a cross bar mounted in said brackets.

3. A fixed gun mount as characterized in claim 2, in combination with an ammunition box, and means for pivotally connecting said box to the bar.

4. The combination as specified in claim 3 and means for adjusting the ammunition box to proper position.

5. A fixed gun mount for airplanes comprising a base, a trunnion support and an elevating support secured to said base, in combination with an ammunition box, and means for pivotally connecting said ammunition box to said base.

6. The combination as specified in claim 5 including a clip secured to said elevating support, and an adjusting rod connecting said clip and ammunition box.

In testimony whereof I have affixed my signature.

DWIGHT C. MAIER.